(12) United States Patent
Taniguchi

(10) Patent No.: US 7,644,796 B2
(45) Date of Patent: Jan. 12, 2010

(54) MOTORCYCLE FRAME STRUCTURE

(75) Inventor: Masayuki Taniguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 11/588,930

(22) Filed: Oct. 27, 2006

(65) Prior Publication Data

US 2007/0108722 A1    May 17, 2007

(30) Foreign Application Priority Data

Oct. 31, 2005    (JP) .............................. 2005-316553

(51) Int. Cl.
    *B62K 11/00*    (2006.01)
(52) U.S. Cl. .................................. 180/219; 280/281.1
(58) Field of Classification Search ................. 180/274, 180/281.1, 219; 280/274, 281.1
    See application file for complete search history.

(56) References Cited

U.S. PATENT DOCUMENTS

| 5,375,677 | A | * | 12/1994 | Yamagiwa et al. | .......... 180/219 |
| 5,480,001 | A | * | 1/1996 | Hara | .......................... 180/227 |
| 5,845,728 | A | * | 12/1998 | Itoh et al. | .................... 180/219 |
| 6,098,736 | A | * | 8/2000 | Smith | .......................... 180/227 |
| 6,641,169 | B2 | * | 11/2003 | Fukunaga et al. | ........... 280/835 |
| 7,232,142 | B2 | * | 6/2007 | Kudo | .......................... 280/274 |
| 7,316,410 | B2 | * | 1/2008 | Ogura et al. | ................. 280/279 |
| 2006/0197304 | A1 | * | 9/2006 | Ishikawa et al. | ......... 280/281.1 |

FOREIGN PATENT DOCUMENTS

JP    09-095279    4/1997

* cited by examiner

*Primary Examiner*—Tony H. Winner
(74) *Attorney, Agent, or Firm*—Carrier, Blackman & Associates, P.C.; William D. Blackman; Joseph P. Carrier

(57) ABSTRACT

A motorcycle frame is provided such that the spacing between a main frame and a side plate can be easily adjusted, and joint surfaces, at which the side plates and engine hangers abut the main frame, can be easily formed. Each side plate is provided with upper and lower plate-side bosses used for adjusting the spacing between itself and a main frame. A surface of an upper first boss of the main frame, which abuts on the upper plate-side boss, and surfaces of upper second bosses of the main frame, which abut on an upper engine hanger, are provided on the same plane. In addition, a surface of a lower first boss of the main frame, which abuts on the lower plate-side boss, and surfaces of lower second bosses of the main frame, which abut on a lower engine hanger, are provided on the same plane.

14 Claims, 9 Drawing Sheets

MOTORCYCLE FRAME STRUCTURE

CROSS-REFERENCE TO RELATED APPLICATIONS

The present invention claims priority under 35 USC 119 based on Japanese patent application No. 2005-316553, filed on Oct. 31, 2005. The subject matter of this priority document is incorporated by reference herein.

BACKGROUND OF THE INVENTION

1. Field of the Invention

The present invention relates to a frame for a motorcycle. More particularly, the present invention relates to a motorcycle frame of a mono-backbone type, in which a single main frame extends rearwardly along a center of vehicle width, from a head pipe to a pivot portion.

2. Background Art

There is a conventional frame assembly structure in which a main frame, for suspending an engine, extends rearwardly from a head pipe along the center of vehicle width, and then bends on the rear side of the engine so as to extend downwardly to a pivot portion. In this conventional structure, left and right side frames are fastened to a boss, provided in the vicinity of the pivot portion, and a front end portion of a swing arm is held between the main frame and the left and right side plates. Such a frame assembly structure is disclosed, for example, in Japanese Patent Laid-Open No. Hei 09-095279.

The boss, which permits adjustment of the spacing between the pivot portion and the left and right side plates, is provided in the vicinity of the pivot portion, and, in the vicinity of the boss, there is provided a boss for fastening an engine hanger.

In the above-described conventional structure, however, when modifying the swing arm width, due to a modification in the vehicle body design, the adjustment of the spacing between the main frame and each of the side plates must be carried out by modifying the main frame, which is a comparatively large component part. This leads to an increase in cost, and imposes a limitation on the degree of freedom in vehicle body design.

In addition, in the above-described conventional structure, joint surfaces of the bosses that abut on the side plates, used for fastening the side plates, and a joint surface of the boss that abuts on the engine hanger, used for fastening the engine hanger, are provided at different heights. Therefore, when carrying out mechanical work to enhance the surface accuracy of each of the abutting joint surfaces or other similar case, the mechanical work processes are conducted individually, resulting in an increase in the number of steps for manufacturing the frame assembly.

The present invention has been made in consideration of the above-mentioned circumstances, and provides a motorcycle frame in which spacing between a main frame and each side plate can be easily adjusted, and in which joint surfaces, abutting on the side plates and an engine hanger, of the main frame, can be easily processed.

SUMMARY

As a means for solving the above-mentioned problems, a first aspect of the invention is characterized in that a frame assembly (e.g., a frame assembly 5 in an embodiment) for a motorcycle (e.g., a motorcycle 1 in the embodiment) includes a main frame (e.g., a main frame 12 in the embodiment) for suspending an engine (e.g., an engine 15 in the embodiment), the main frame extending rearwards from a head pipe (e.g., a head pipe 6) along the center of vehicle width and then bending on the rear side of the engine to extend down to a pivot portion (e.g., a pivot portion 10 in the embodiment). The frame assembly also includes a swing arm (e.g., a swing arm 9 in the embodiment) pivotally supported by the pivot portion. The swing arm is held between a left-right pair of side plates (e.g., side plates 16 in the embodiment) disposed with said main frame therebetween. The side plates each abut on and are joined to a first joint portion (e.g., each of first bosses 55, 56 in the embodiment) provided in the main frame. The frame assembly further includes an engine hanger (e.g., each of engine hangers 57, 58 in the embodiment) for supporting the engine on the main frame. The engine hanger abuts on and is joined to a second joint portion (e.g., each of second bosses 59, 60, 61, 62 in the embodiment) provided in the main frame. In the invention, each of the side plates is provided with spacers (e.g., each of plate-side bosses 46, 47 in the embodiment) for adjusting the spacing between itself and the main frame. A first joint surface (e.g., each of first boss surfaces 55*b*, 56*b* in the embodiment) of the first joint portion, which abuts on the side plate, and a second joint surface (e.g., each of second boss surfaces 59*b*, 60*b*, 61*b*, 62*b* in the embodiment) of the second joint portion, which abuts on the engine hanger, are configured such that the first joint surface and the second joint surface are disposed on the same plane.

According to the first aspect of the invention, the side plate is provided with the means for adjusting the spacing between the main frame and the side plate, whereby it is ensured that even when modifying the spacing between the main frame and the side plate according to the swing arm width, it is possible to cope with the requirement by replacing the comparatively small side plates. Therefore, the need to modify the comparatively large main frame is eliminated, the cost required for modifying the swing arm width is suppressed, and the degree of freedom in vehicle body designing is enhanced.

In addition, with the first and second joint surfaces provided on the same plane, it is ensured that even when forming the first and second joint surfaces by mechanical work or the like so as to enhance the surface accuracy of the surfaces for the purpose of enhancing the positional accuracy of the side plates and the engine hanger, the work surfaces can be processed simultaneously and, therefore, the number of steps for manufacturing the frame assembly is reduced.

A second aspect of the invention is characterized in that, in the motorcycle frame as set forth in the first aspect thereof, a seat frame (e.g., a seat frame 13 in the embodiment) extends rearwardly from a rear portion of the main frame, and abuts on and is joined to a third joint portion (e.g., each of third bosses 67, 68 in the embodiment) provided in the main frame. A third joint surface (e.g., each of third boss surfaces 67*b*, 68*b* in the embodiment) of the third joint portion, which abuts on the seat frame, is provided on the same plane as the first and second joint surfaces.

According to the second aspect of the invention, the third joint surface for joining the seat frame is provided on the same plane as the first and second joint surfaces, whereby it is ensured that even when forming the third joint surface by mechanical work or the like so as to enhance the surface accuracy thereof, the mechanical work can be carried out collectively at the time of processing the first and second joint surfaces, so that the number of steps for manufacturing the frame assembly is further reduced.

A third aspect of the invention is characterized in that a frame assembly (e.g., a frame assembly 5 in an embodiment) for a motorcycle (e.g., a motorcycle 1 in the embodiment)

includes a main frame (e.g., a main frame 12 in the embodiment) for suspending an engine (e.g., an engine 15 in the embodiment). The main frame extends rearwardly from a head pipe (e.g., a head pipe 6 in the embodiment) along the center of vehicle width and then is bent downward on the rear side of the engine so as to extend down to a pivot portion (e.g., a pivot portion 10 in the embodiment). The frame assembly includes a swing arm (e.g., a swing arm 9 in the embodiment) pivotally supported by the pivot portion. The swing arm is held between a left-right pair of side plates (e.g., side plates 16 in the embodiment) disposed with said main frame therebetween, and the side plates each abut on and are joined to a first joint portion (e.g., each of first bosses 55, 56 in the embodiment) provided in the main frame. At least one of the main frame and each of the side plates is provided, as a separate member, with means (e.g., each of plate-side bosses 46, 47 in the embodiment) for adjusting the spacing therebetween.

According to the third aspect of the invention, the means for adjusting the spacing between the main frame and the side plate is provided so as to be replaceable, whereby it is ensured that even in the case of modifying the spacing between the main frame and the side plate according to the swing arm width, it is possible to cope with the requirement easily and flexibly, so that the degree of freedom in vehicle body designing is enhanced.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
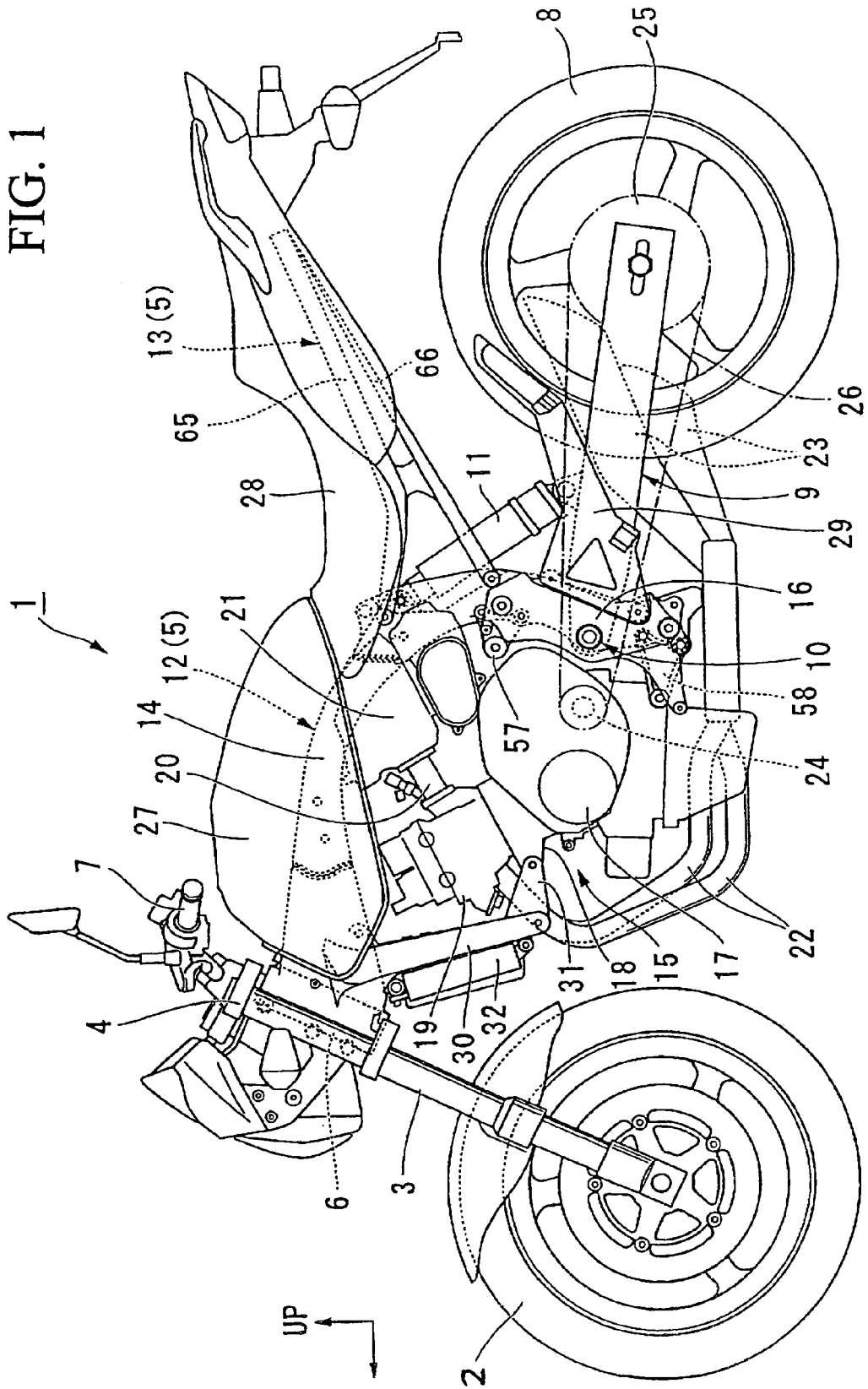
FIG. 1 is a left side view of a motorcycle including a frame according to an illustrative embodiment of the present invention.

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. In the following description, directions such as front, rear, left and right are to be understood as the directions with reference to the vehicle, unless otherwise specified. Additionally, in the drawings, arrow FR indicates the front side of the vehicle, arrow LH indicates the left-hand side of the vehicle, and arrow UP indicates the upper side of the vehicle.

As shown in FIG. 1, a front wheel 2 of a motorcycle 1 is rotatably supported by lower end portions of a left-right pair of front forks 3, and an upper portion of the left and right front forks 3 is steerably and pivotally supported on a head pipe 6 at a front end portion of a frame assembly 5 through a steering stem 4. A steering handlebar 7 is mounted on the steering stem 4. A rear wheel 8 of the motorcycle 1 is rotatably supported on a rear end portion of a swing arm 9, and a front end portion of the swing arm 9 is vertically swingably and pivotally supported on a pivot portion 10 at a rear portion of the frame assembly 5. A rear shock absorber unit 11 is disposed between a front portion of the swing arm 9 and a rear portion of the frame assembly 5.

The frame assembly 5 is composed mainly of a main frame 12, bridgingly provided between the head pipe 6 and the pivot portion 10, and a seat frame 13 extending rearwardly from a rear portion of the main frame 12.

The main frame 12 is used for suspending an engine 15, and is a mono-backbone type frame in which a single frame body 14 extends rearwardly from the head pipe 6 along the center of vehicle width and on the upper side of the engine 15, and then is bent downwardly to reach the pivot portion 10. In addition, a left-right pair of side plates 16 are disposed covering the main frame 12, on the left and right sides of the pivot portion 10 of the main frame 12.

The engine 15 is a prime mover of the motorcycle 1, and is disposed on the inside of the main frame 12. In the depicted embodiment, the engine 15 is a transversely mounted parallel 4-cylinder engine having a crankshaft extending in the vehicle width direction (left-right direction), in which cylinders 18 are provided on a crankcase 17, and a throttle body 20 is connected to an intake port at a rear portion of a cylinder head 19 on each cylinder 18. A rear portion of each throttle body 20 is connected to an air cleaner 21 disposed on the rear side thereof. Exhaust pipes 22 are led from exhaust ports at front portions of the cylinder heads 19, and are turned to the lower side of the engine 15 to be collected appropriately, before being connected to a muffler 23, which rises up on the right side of the swing arm 9, for example.

A drive sprocket 24 is disposed on the rear left side of the engine 15, and an endless form drive chain 26 is wrapped around the drive sprocket 24 and a driven sprocket 25 disposed on the left side of the rear wheel 8. A fuel tank 27, supported on the main frame 12, is disposed on the upper side of the engine 15, and a seat 28 supported on the seat frame 13 is disposed on the rear side of the fuel tank 27. The seat 28 has a front half portion for the rider, and a rear half portion for the passenger. Step brackets 29 for supporting steps for the rider and the passenger are attached to rear portions of the left and right side plates.

Figure 2:
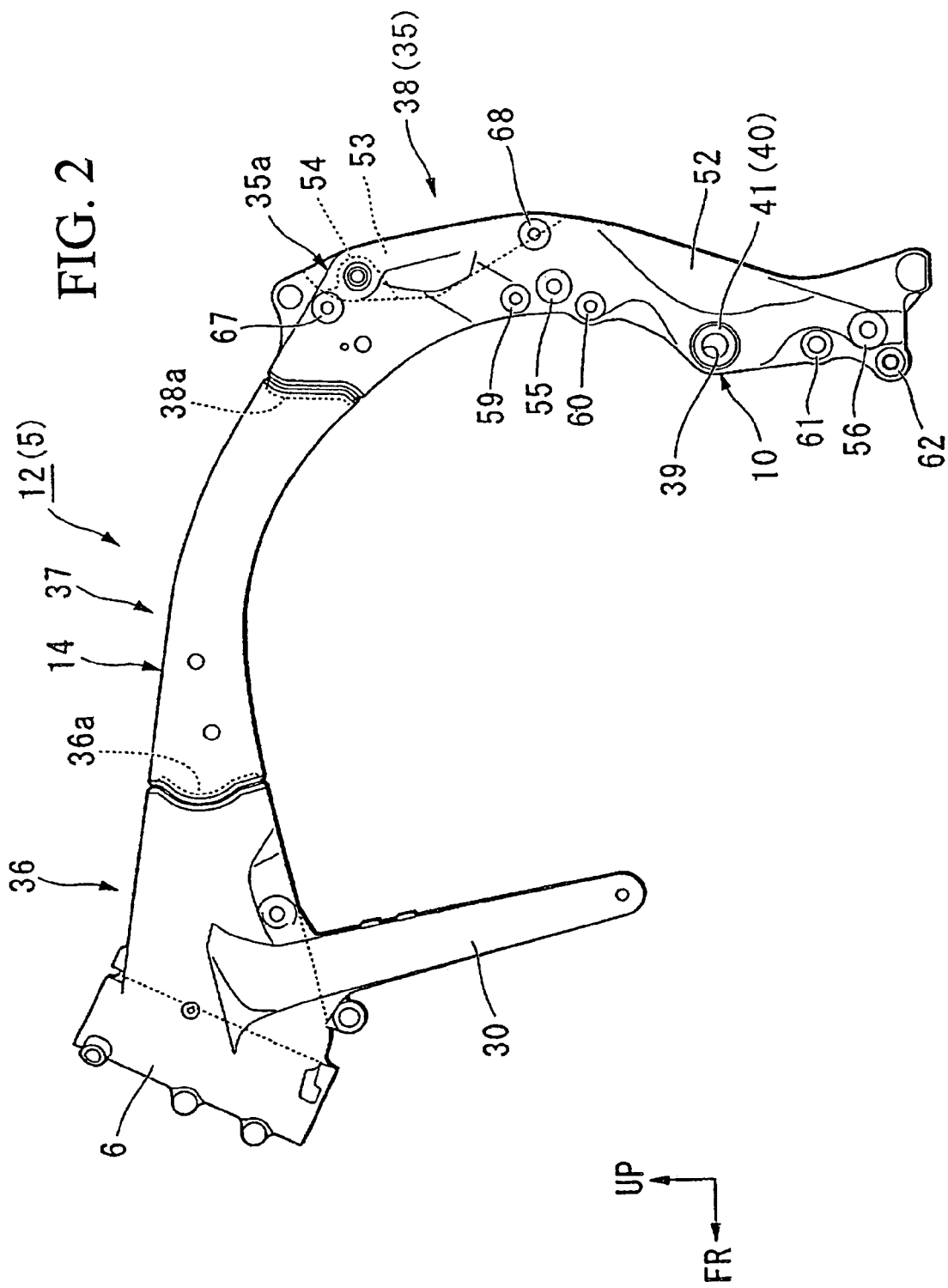
FIG. 2 is an isolated left side view of a main frame of the motorcycle of FIG. 1.

The main frame 12 includes two engine stays 30 (FIG. 2), which branch outwardly from a front end portion of the frame body 14 to the left and right sides, respectively, and which then extend downwardly. Lower end portions of the engine stays 30 extend to positions on the front side of the cylinders 18. Front engine hangers 31 (FIG. 1), fastened to the lower end portions of the engine stays 30, are also fastened to front portions of the cylinders 18 of the engine 15, to support the latter. Additionally, a radiator 32, for cooling the engine 15, is disposed immediately on the front side of the engine stays 30.

Referring again to FIG. 2, an intermediate portion 37 of the frame body 14, in the front-rear direction, is bent to be protuberant to the upper side, and a portion 38 on the rear side thereof is bent to be protuberant to the rear upper side, and is then extended downwardly to reach the pivot portion 10. The portion extended downwardly will be described as a rear frame portion 35, including a bent portion or protuberance 35a on the rear side.

Here, the main frame 12 is trisected into a front piece 36 formed as one integral body (including the head pipe 6, the engine stays 30 and a front portion of the frame body 14), a center piece 37 formed as one integral body, including an intermediate portion of the frame body 14, and a rear piece 38 formed as one integral body, including the rear portion 35 of the frame body.

The pieces 36, 37 and 38 are hollow aluminum die-cast products cast from an aluminum-containing metal (inclusive of aluminum alloys). A rear end portion of the front piece 36 and a front end portion of the rear piece 38 are provided with intersecting protruding portions 36a and 38a matched into open end portions at the front and rear portions of the center piece 37. In the condition where the protruding portions 36a and 38a are inserted in the open end portions at the front and rear portions of the center piece 37, the open end portions are subjected to entire-circumference welding, whereby the pieces 36, 37 and 38 are integrally joined to constitute the main frame 12.

Figure 5:
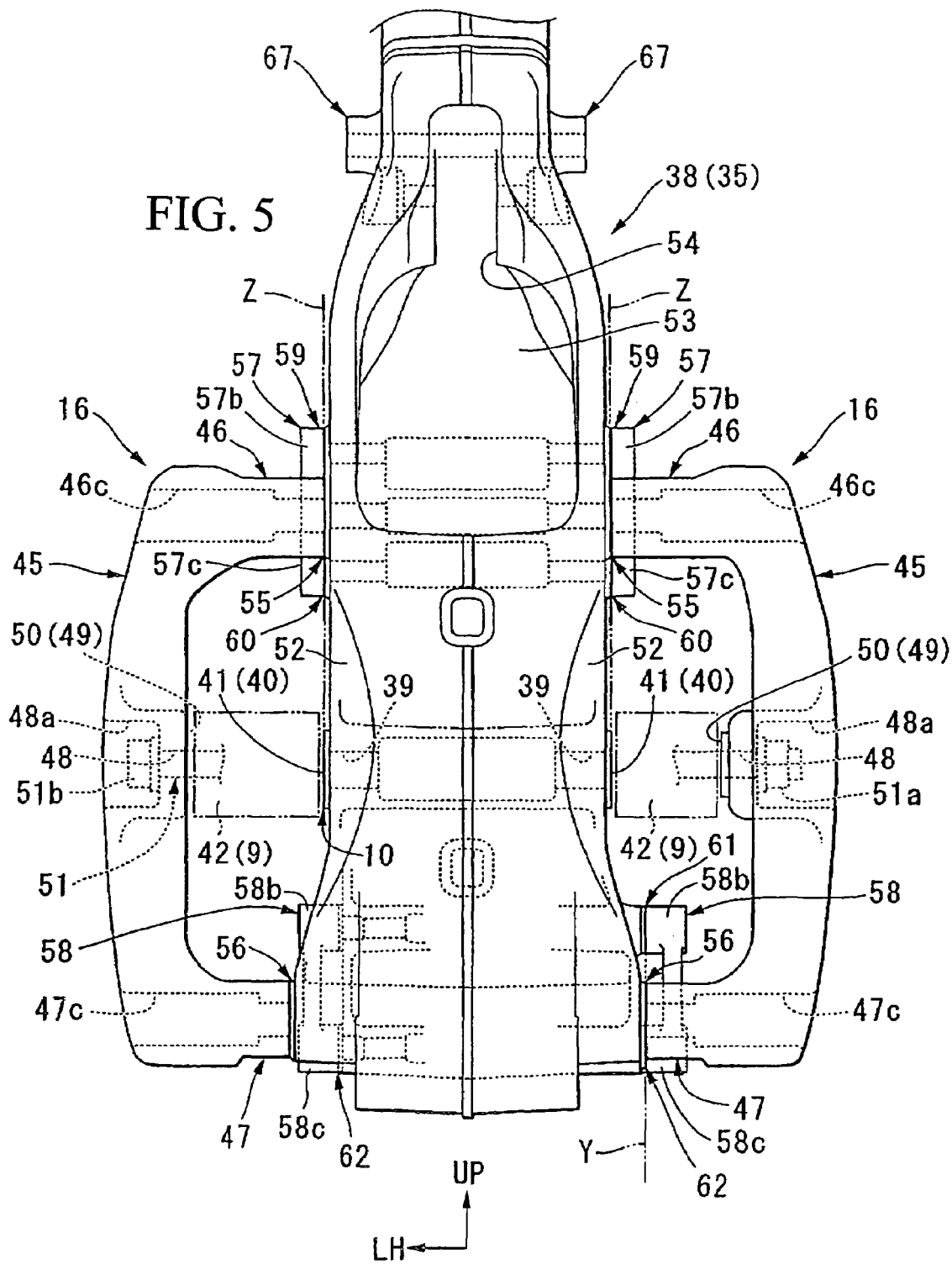
FIG. 5 is a rear view of a rear portion of the main frame corresponding to FIG. 3.

The frame body 14 has a generally square hollow sectional shape at an intermediate portion thereof, and is formed to be greater in vertical width on the front side at a front half portion thereof (see FIG. 5). In addition, a front end portion of the frame body 14 is integrated with a rear portion of the head pipe 6 over the vertical range of the rear portion.

Figure 3:
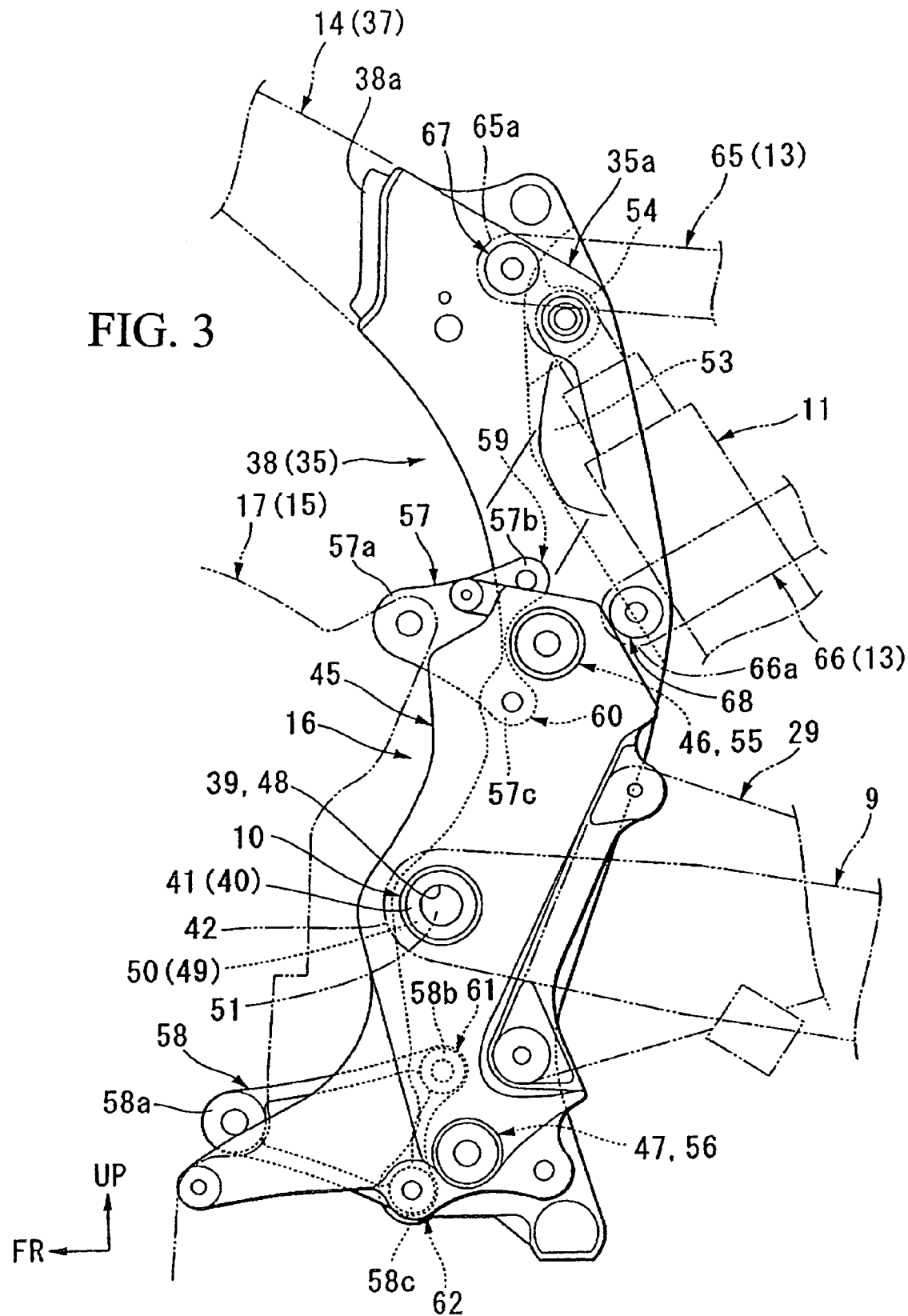
FIG. 3 is a left side view of a rear portion of the main frame of FIG. 2 and component parts attached thereto.
Figure 4:
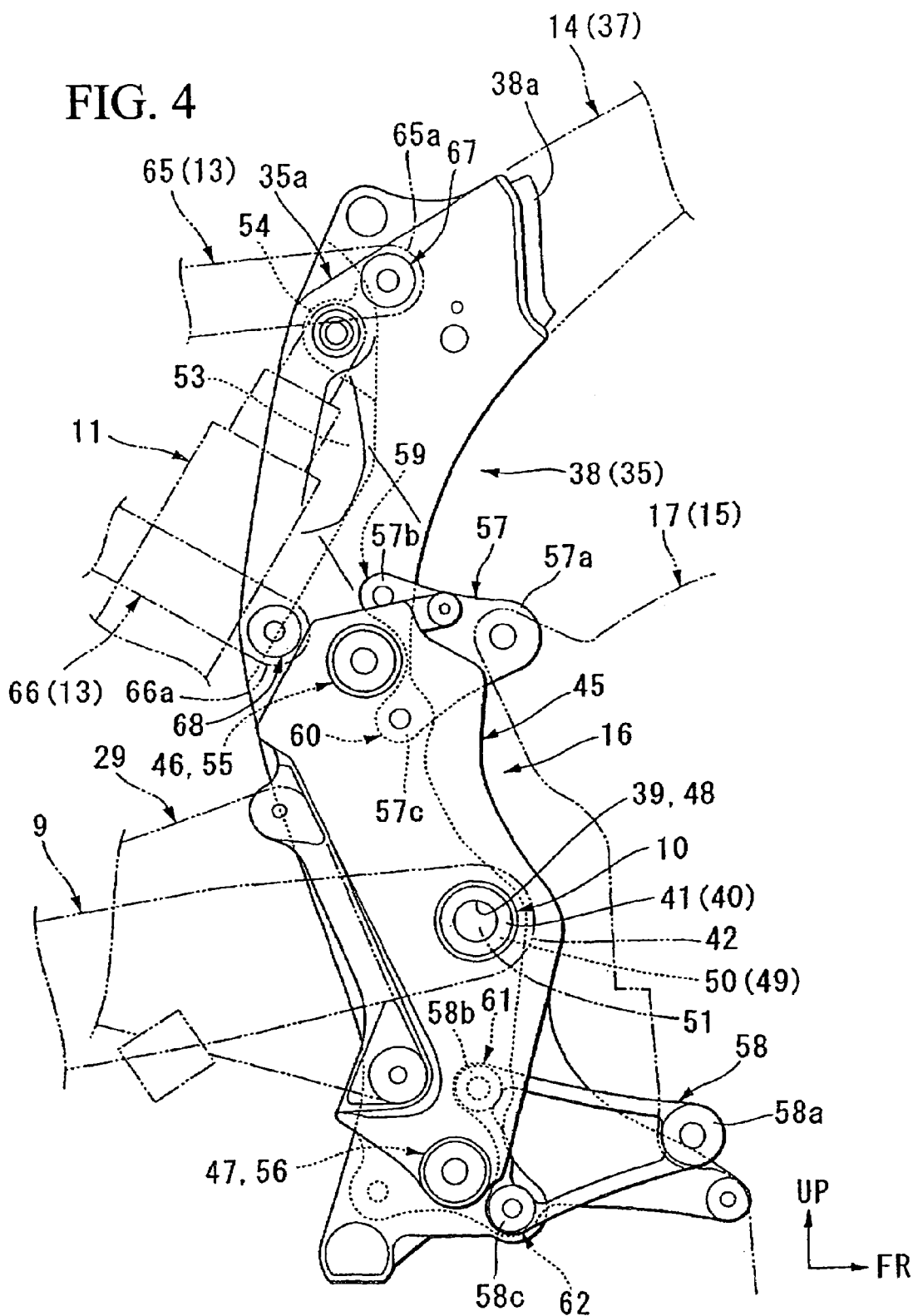
FIG. 4 is a right side view of a rear portion of the main frame corresponding to FIG. 3.

As shown in FIGS. 3, 4 and 5, the rear frame portion 35 is slightly inclined downwardly and forward, on the lower side of the bent portion 35a. In addition, the rear frame portion 35 is gradually broadened to the left and the right below an intermediate portion of the bent portion 35a, and then extends downward while keeping the left-right width substantially constant.

The lower front side of the rear frame portion 35 is formed to have a mound-like shape protuberant to the front side. The pivot portion 10 is so provided with pivot holes 39 extending horizontally transversely therethrough, to penetrate through a peak portion of the mound-like shape in the left-right direction. The pivot portion 10 has a configuration in which both side walls of the rear frame portion 35 are provided with the pivot holes 39, and a collar is formed in the rear frame portion 35, oriented so as to extend along the left-right direction to range between the pivot holes 39.

Figure 6:
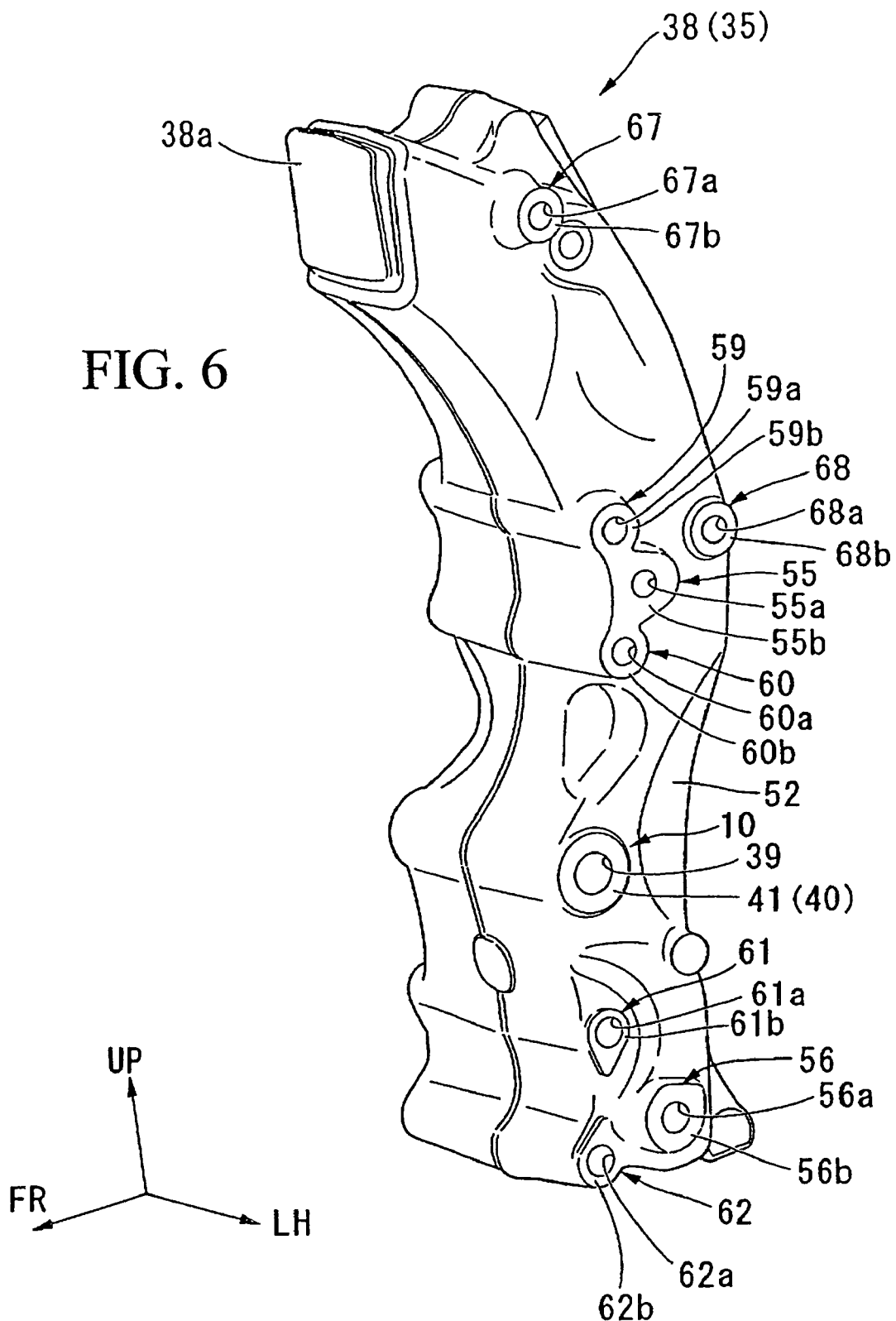
FIG. 6 is a perspective view, as viewed from the left front side, of the rear portion of the main frame corresponding to FIG. 3.
Figure 7:
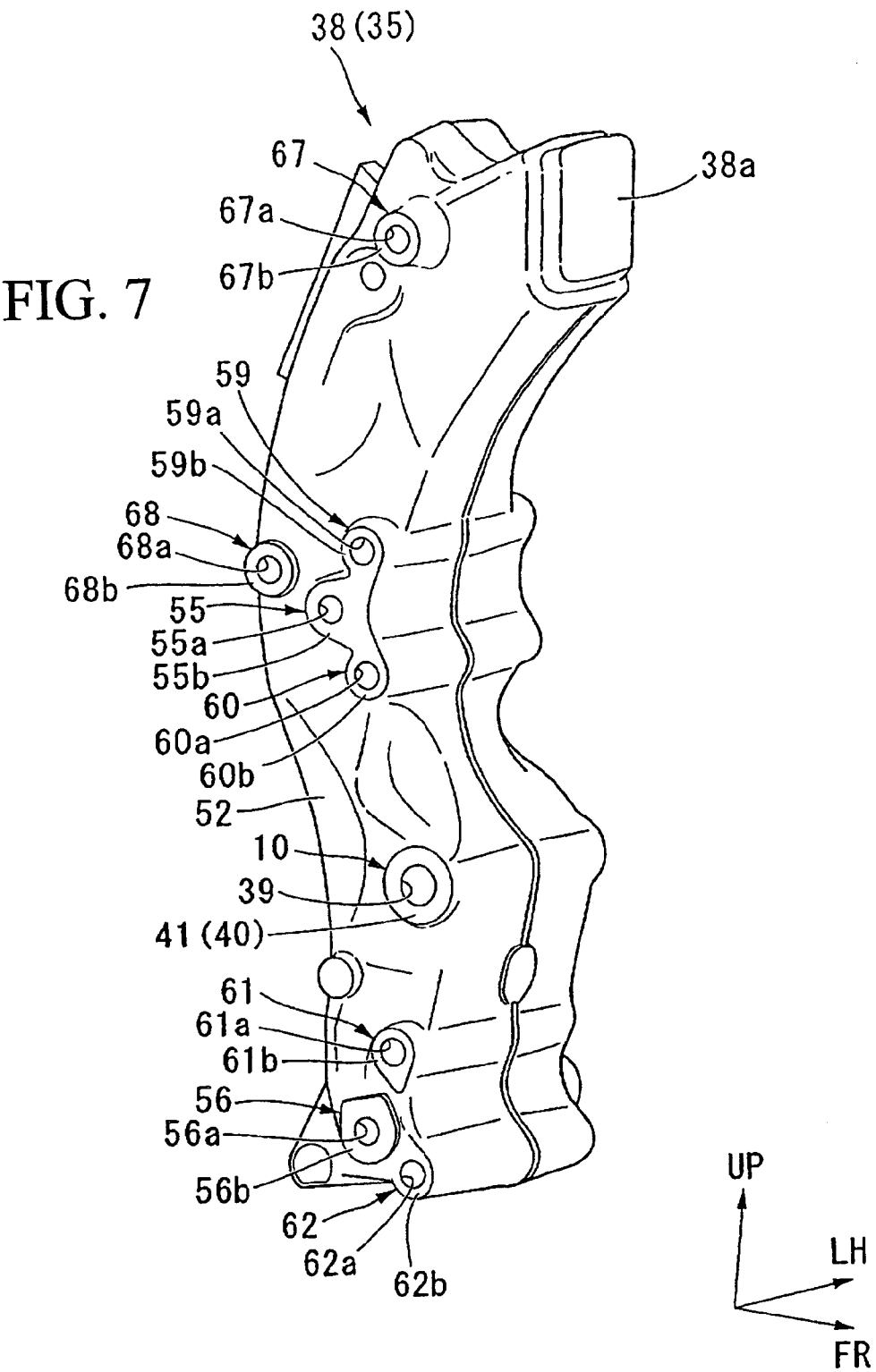
FIG. 7 is a perspective view, as viewed from the right front side, of the rear portion of the main frame corresponding to FIG. 3.

Referring to FIGS. 6 and 7 also, in the vicinity of the left and right outer sides of the left and right pivot holes 39, there are provided annular pivot pedestal portions 40 projecting slightly outwardly to the left and right outer sides from outside surfaces of the rear frame portion 35. Pivot seat surfaces 41, orthogonal to the left-right direction, are formed at the left and right outside ends of the pivot pedestal portions 40.

Left and right arm pivot portions 42 (FIGS. 3-4), formed individually at a front end portion of each respective swing arm 9, are adjacently disposed on the left and right outer sides of the left and right pivot pedestal portions 40. Collars (not shown), rotatable around an axis along the left-right direction, are held on the left and right inner sides of the arm pivot portions 42, and the left and right inside ends of the collars abut on the pivot seat surfaces 41 of the pivot pedestal portions 40.

On both sides of a lower portion of the rear frame portion 35, the left and right side plates 16 are disposed in the manner of sandwiching the lower portion from the left and right sides.

Figure 8:
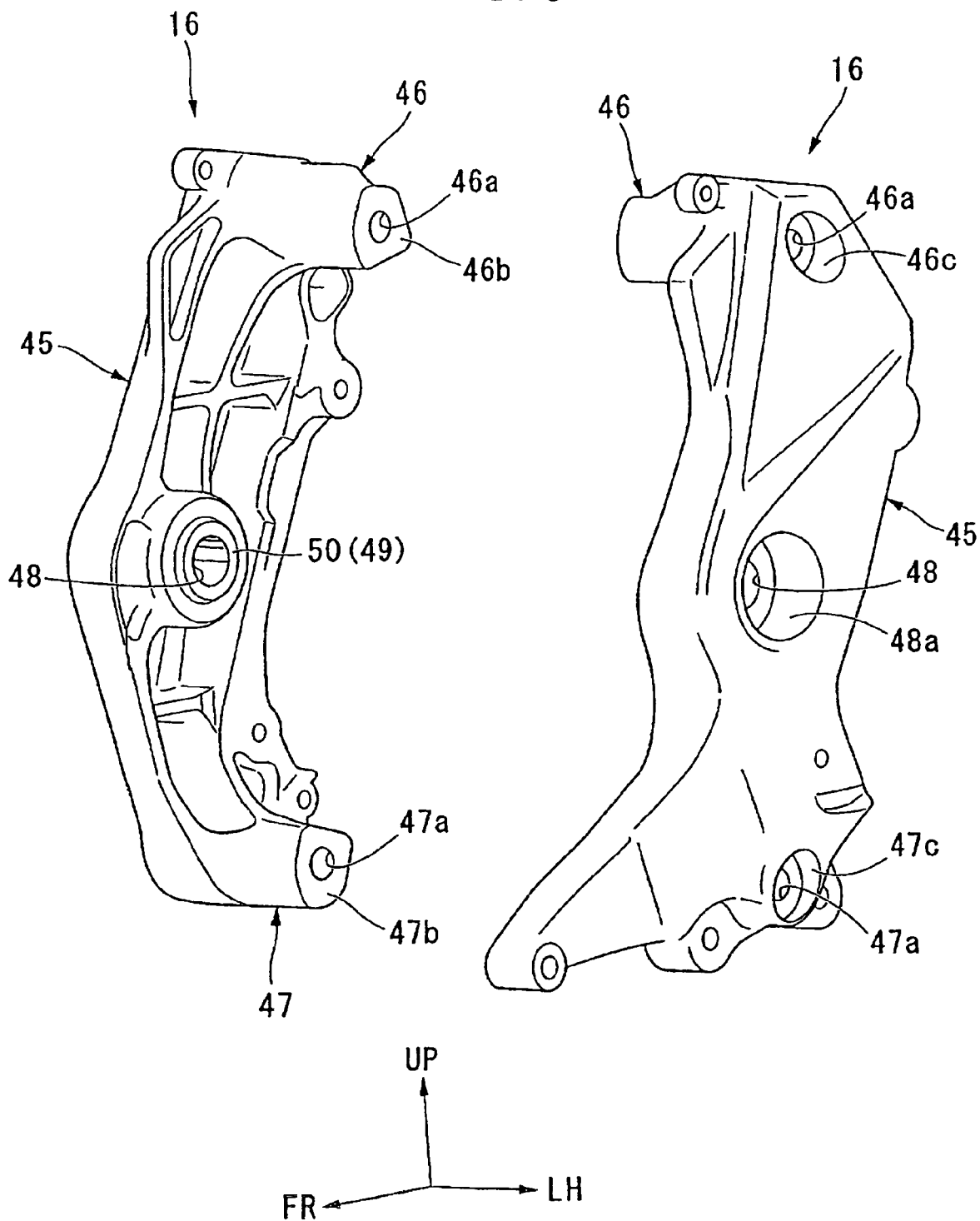
FIG. 8 is a perspective view, as viewed from the left front side, of left and right side plates which, when assembled, are attached to the rear portion of the main frame.
Figure 9:
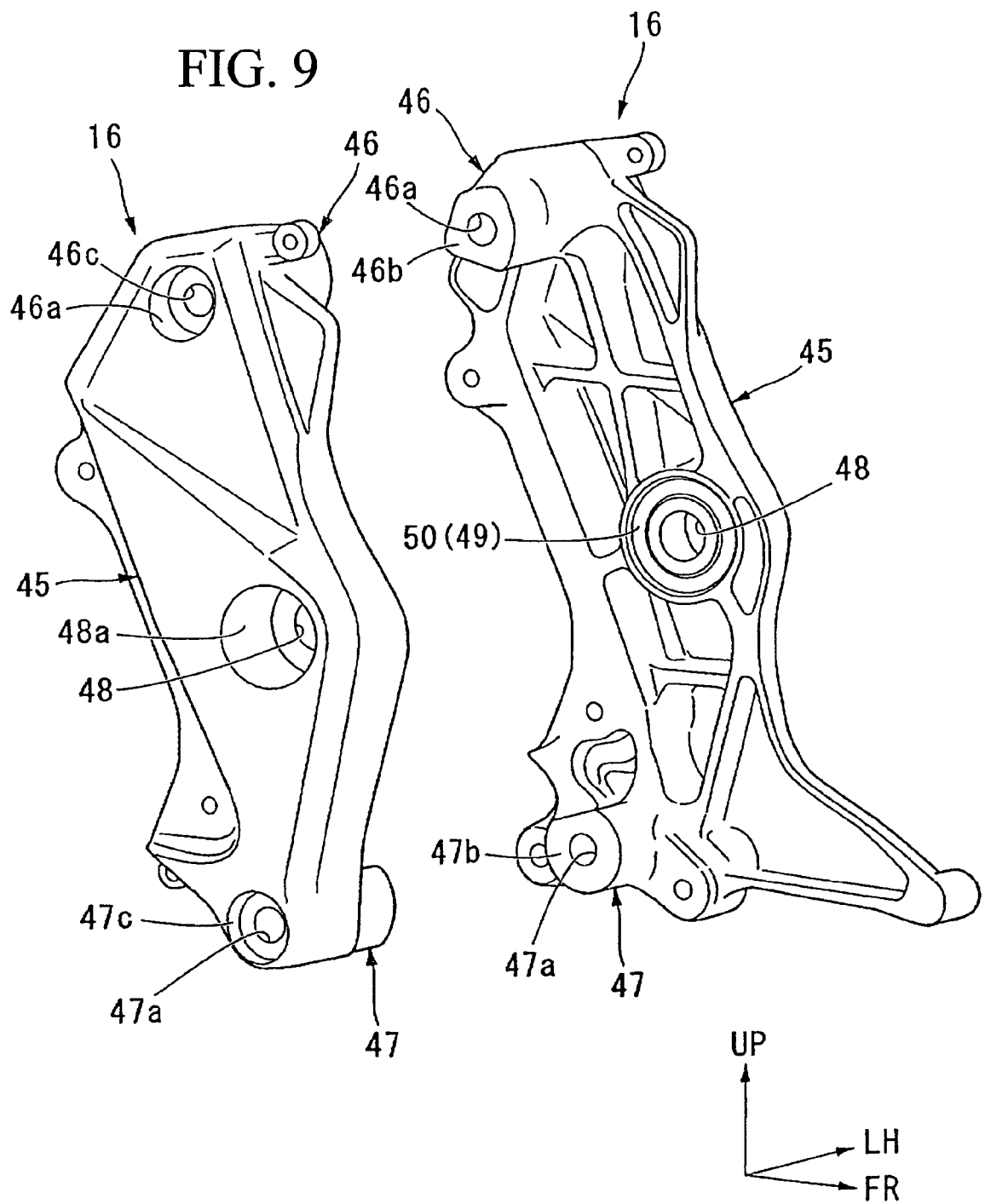
FIG. 9 is a perspective view, as viewed from the right front side, of the left and right side plates of FIG. 8.

Referring to FIGS. 8 and 9 also, the left and right side plates 16 each have a configuration in which a plate main body 45 is in a plate-like shape generally orthogonal to the left-right direction, and upper and lower plate-side bosses or mounting bosses (means for adjusting a spacing) 46 and 47 are projected to the left-right inner side from the left-right inner side of upper and lower end portions of the plate main body 45. The tip ends of the upper and lower plate-side bosses 46 and 47 are abutted on the left-right outside of the rear frame portion 35, whereby a predetermined spacing is formed between the plate main body 45 and the rear frame portion 35.

Intermediate portions in the vertical direction of the left and right side plates 16 are provided with pivot side holes 48 coaxial with the pivot portion 10. An annular plate pedestal portion 49 is provided in the surroundings of the left-right inner side of the pivot side hole 48, and a plate seat surface 50 orthogonal to the left-right direction is formed at the left-right inside end of the plate pedestal portion 49. The plate seat surfaces 50 are surfaces for abutting on the left-right outside ends of the above-mentioned collars in the arm pivot portion 42 at the front end portion of the swing arm 9.

A pivot shaft 51 extends in the left-right direction of the vehicle so as to pass through the pivot portion 10 of the main frame 12, the front end portion of the swing arm 9, and the intermediate portions in the vertical direction of the left and right side plates 16. The pivot shaft 51 is configured as a stepped bolt having an elongate shank portion, and is, for example, passed through the pivot portion 10, the swing arms 9 and the side plates 16 from the vehicle body left side, and a nut 51a is screw engaged with and fastened to a right side portion of the pivot shaft 51 from the vehicle body right side. As a result, the above-mentioned collar in the arm pivot portion 42 is held between the pivot pedestal portion 40 and the plate pedestal portion 49, and a front end portion of the swing arm 9 is vertically swingably supported by the pivot portion 10 of the main frame 12.

Incidentally, the swing arms 9 are configured to be asymmetric on the left and right sides, for convenience of layout of the exhaust pies 22, the drive chain 26 and the like. To accommodate the asymmetric swing arms 9, for example, the plate pedestal portion 49 on the right side is provided projectingly to the inner side in the left-right direction from the inside surface of the side plate 16. On the other hand, the plate pedestal portion 49 on the left side is provided roughly on the same plane as the inside surface of the side plate 16.

A portion of the rear frame portion 35 on the rear side of the pivot portion 10 is provided with left and right recessed portions 52. Recessed portions 52 are substantially spherical recesses formed in the edge portions where the left and right outside (lateral side) surfaces meet the rear surface. In addition, the rear frame portion 35 is provided on the rear side of an upper portion thereof with a rear recessed portion 53 formed by recessing the relevant portion for securing a clearance between itself and the rear shock absorber unit 11. At an upper portion of the rear recessed portion 53, there is provided a support portion 54 for supporting an upper end portion of the rear shock absorber unit 11.

The left and right side plates 16 are aluminum die-cast products, like the pieces 36, 37 and 38 of the main frame 12. Weight reduction techniques are appropriately applied to the left-right inner side of the thick plate-like plate main body 45, leaving the outer wall and reinforcing ribs.

The upper and lower plate-side bosses 46 and 47 of the left and right side plates 16 are provided in their central portions with plate-side boss holes 46a and 47a penetrating therethrough along the left-right direction, and the tip ends of the upper and lower plate-side bosses 46 and 47 are formed as plate-side boss surfaces 46b and 47b orthogonal to the left-right direction.

On the other hand, at vertically intermediate portions and lower end portions on the front side of left-right outside portions of the rear frame portion 35, there are provided upper and lower first bosses (first joint portions) 55 and 56 in which seat surfaces slightly projecting to the left-right outer sides are formed on both side walls of the rear frame portion 35. The upper and lower first bosses 55 and 56 are provided in their central portions with first boss holes 55a and 56a having female screws at inner peripheries thereof and formed, for example, to penetrate along the left-right direction (or formed in a bottomed form). In addition, the tip ends (the above-mentioned seat surfaces) of the upper and lower first bosses 55 and 56 are formed as first boss surfaces (first joint surfaces) orthogonal to the left-right direction. The plate-side boss surfaces 46b and 47b of the upper and lower plate-side bosses 46 and 47 abut on the first boss surfaces 55b and 56b.

The left and right side plates 16 are disposed on both sides of a lower portion of the rear frame portion 35, and the plate-side boss surfaces 46b and 47b of the upper and lower plate-side bosses 46 and 47 are abutted on the first boss surfaces 55b and 56b of the upper and lower first bosses 55 and 56. In this condition, fastening bolts (not shown) are inserted from the left-right outer sides into the plate-side boss holes 46a and 47a of the upper and lower plate-side bosses 46 and 47, and are screwed into the first boss holes 55a and 56a of the upper and lower first bosses 55 and 56 and tightened, whereby the upper and lower plate-side bosses 46 and 47 and the upper and lower first bosses 55 and 56 are fastened to each other, resulting in that the left and right side plates 16 and the rear frame portion 35 are integrally joined to each other.

In this case, between the outside portions of the rear frame portion 35 and the inside portions of the left and right side plates 16, there are formed the above-mentioned spacings in amounts equal to the sums of the heights of projection of the upper and lower first bosses 55, 56 from the outside surfaces of the rear frame portion 35 and the heights of projection of the upper and lower plate-side bosses 46, 47 from the inside surfaces of the left and right side plates 16. Front end portions of the swing arms 9 inserted into the spacings are each held between the side plate 16 and the rear frame portion 35. The lower first boss 56 projects to the left-right outer sides beyond the outside surfaces of the rear frame portion 35.

Incidentally, the outside surfaces of the left and right side plates 16 constitute part of the outside surface of the vehicle body. Therefore, counterbore portions 46c, 47c, 48a for sinking a bolt head portion of the above-mentioned fastening bolt or a bolt head portion 51b of the pivot shaft 51 or the nut 51a to the left-right inner side are provided in the surroundings of the left-right outer sides of the upper and lower plate-side boss holes 46a, 47a and in the surroundings of the left-right outer sides of the above-mentioned pivot side hole 48.

As shown in FIGS. 3, 4 and 5, an upper engine hanger 57 for supporting the upper side of a rear portion of the crankcase 17 of the engine 15 and a lower engine hanger 58 for supporting the lower side of the rear portion of the crankcase 17 are attached to vertically intermediate portions and lower end portions (the vicinity of the upper and lower first bosses 55, 56) on the front side of the left-right outside portions of the rear frame portion 35. The engine 15 is suspended from the main frame 12 through these engine hangers 57, 58 and the above-mentioned engine hanger 31.

In addition, the main frame 12 is also the so-called diamond type frame in which a frame member on the lower side of the engine 15 is eliminated, and the engine 15 serves also as a reinforcing member of the main frame 12, whereby the position of the engine 15 is lowered, thereby contriving a lowering of the center of gravity, and the number of the frame members is reduced, thereby restraining increases in the weight and cost of the main frame.

The upper engine hanger 57 has a generally triangular shape in side view, with a front end portion thereof as a portion to be fastened to the crankcase 17, and with upper and lower parts of a rear end portion thereof as portions to be fastened to the rear frame portion 35. The upper engine hanger 57 is formed by blanking into a predetermined shape a steel-made thick plate orthogonal to the left-right direction, for example. The vertices of the triangular shape are made to be a front fastening portion 57a provided with a bolt insertion hole, an upper-stage rear fastening portion 57b, and a lower-stage rear fastening portion 57c. In such an upper engine hanger 57, the same component parts can be used in common for the left and right portions of the vehicle body.

On the other hand, the lower engine hanger 58 has a generally triangular shape in side view, with a front end portion thereof as a portion to be fastened to the crankcase 17, and with upper end lower parts of a rear end portion thereof as portions to be fastened to the rear frame portion 35, similarly to the above-mentioned. The lower engine hanger 58 is a casting cast from a steel, for example. The vertices of the triangular shape are made to be a boss-like front fastening portion 58a provided with a bolt insertion hole along the left-right direction, an upper-stage rear fastening portion 58b, and a lower-stage rear fastening portion 58c. The left-right inside and outside surfaces of the fastening portions 58a, 58b, 58c are provided on planes orthogonal to the left-right direction.

Thus, with a rear portion of the crankcase 17 supported by use of the engine hangers 57 and 58 which are different on the upper and lower sides, the engine 15 asymmetric on the left and right sides can be suspended with a predetermined support rigidity. Incidentally, while the lower engine hanger 58 in this embodiment is a component part comprised of a mirror-image on the left and right sides for convenience of designing, the same component parts may be in common for the left and right sides of the vehicle body by modifying the shapes of them in side view, the shapes of the fastening portions 58a, 58b, 58c, or the like.

Referring to FIGS. 8 and 9 also, upper-lower stage upper second bosses (second joint portions) 59, 60 adjacent to the upper front side and the lower front side of the upper first boss 55 are provided at vertically intermediate portions on the front side of left and right outside portions of the rear frame portion 35. The upper second bosses 59, 60 are formed with seat surfaces slightly projecting to the left-right outer sides on both side walls of the rear frame portion 35, are provided in their central portions with upper second boss holes 59a, 60a having female screws at inner peripheries thereof and formed, for example, to penetrate along the left-right direction (or formed in a bottomed form), and their tip ends (the seat surfaces) are formed as upper second boss surfaces (second joint surfaces) 59b, 60b orthogonal to the left-right direction.

Similarly, upper-lower stage lower second bosses (second joint portions) 61, 62 adjacent to the upper front side and the lower front side of the lower first boss 56 are provided at lower end portions on the front side of the left and right outside portions of the rear frame portion 35. The lower second bosses 61, 62 are formed with seat surfaces slightly projecting to the left-right outer sides on both side walls of the rear frame portion 35, are provided in their central portions with lower second boss holes 61a, 62a having female screws at inner peripheries thereof and formed, for example, to penetrate along the left-right direction (or formed in a bottomed form), and their tip ends (the seat surfaces) are formed as lower second boss surfaces (second joint surfaces) 61b, 62b orthogonal to the left-right direction.

In the condition where the inside surfaces of the rear fastening portions 57b and 57c of the upper engine hanger 57 abut on the second boss surfaces 59b and 60b of the upper second bosses 59 and 60, fastening bolts (not shown) are inserted into the rear fastening portions 57b and 57c from the left-right outer sides, and they are screwed into the second boss holes 59a and 60a of the upper second bosses 59 and 60 and tightened, whereby the rear fastening portions 57b and 57c and the upper second bosses 59 and 60 are fastened to each other, resulting in that the upper engine hanger 57 and the rear frame portion 35 are integrally joined to each other.

Similarly, in the condition where the inside surfaces of the rear fastening portions 58b and 58c of the lower engine hanger 58 abut on the second boss surfaces 61b and 62b of the lower second bosses 61 and 62, fastening bolts (not shown) are inserted into the rear fastening portions 58b and 58c from the left-right outer sides, and they are screwed into the second boss holes 61a and 62b of the lower second bosses 61 and 62 and tightened, whereby the rear fastening portions 58b and 58c and the lower second bosses 61 and 62 are fastened to each other, with the result that the lower engine hanger 58 and the rear frame portion 35 are integrally joined to each other.

As shown in FIGS. 1, 3 and 4, upper and lower front end portions of the seat frame 13 are attached to upper end portions and vertically intermediate portions on the rear side of both side portions of the rear frame portion 35.

The seat frame 13 has seat rails 65 extending in the front-rear direction slightly forwardly downwardly for directly supporting the seat 28, and sub rails 66 disposed on the lower side of the seat rails 65 at an inclination slightly steeper than that of the seat rails 65. Rear portions of the rails 65, 66 are united, while front end portions of the rails 65, 66 constitute upper and lower fastening portions 65a, 66a for fastening to the rear frame portion 35.

On the other hand, upper and lower third bosses (third joint portions) 67, 68 projecting to the left-right outer sides are provided at upper end portions and vertically intermediate portions on the rear side of left and right outside portions of the rear frame portion 35.

Referring to FIG. 5 also, the upper third bosses 67 are formed with pedestals projecting to the left-right outer sides on both side walls of the rear frame portion 35. In addition, the lower third bosses 68 are formed with seat surfaces projecting to the left-right outer sides on both side walls of the rear frame portion 35.

Referring to FIGS. 6 and 7 also, the upper and lower third bosses 67 and 68 are provided in their central portions with upper and lower third boss holes 67a and 68a having female screws at inner peripheries thereof and formed, for example, to penetrate along the left-right direction (or formed in a bottomed form), and the tip ends (the tip ends of the pedestals or the seat surfaces) of the upper and lower third bosses 67 and 68 are formed as upper and lower third boss surfaces (third joint surfaces) 67b and 68b orthogonal to the left-right direction.

When the inside surfaces of the upper and lower fastening portions 65a and 66a of the seat frame 13 abut on the third boss surfaces 67b and 68b of the upper and lower third bosses 67 and 68, fastening bolts (not shown) are inserted into the upper and lower fastening portions 65a and 66a from the left-right outer sides, and they are screwed into the third boss holes 67a and 68a of the upper and lower third bosses 67 and 68 and tightened, whereby the upper and lower fastening portions 65a and 66a and the upper and lower third bosses 67 and 68 are fastened to each other, resulting in that a front end portion of the seat frame 13 and the rear frame portion 35 are integrally joined to each other.

Here, the upper first boss 55, the upper second bosses 59, 60 and the lower third boss 68 are proximate to one another, and the boss surfaces 55b, 59b, 60b, 68b of the bosses 55, 59, 60, 68 are provided on the same plane Z orthogonal to the left-right direction (see FIG. 5). In addition, in this embodiment, the pivot seat surfaces 41 on both sides of the pivot portion 10 are each also provided on the plane Z.

Furthermore, in this embodiment, the boss surfaces 56b, 61b, 62b of the lower first boss 56 and the lower second boss 61, 62 on the vehicle body right side are provided on the same plane Y orthogonal to the left-right direction (see FIG. 5).

Incidentally, in this embodiment, the first boss surfaces 56b of the left and right lower first bosses 56 are provided at positions spaced by the same distance to the left and the right from the vehicle body center plane; on the other hand, the second boss surfaces 61b, 62b of the left and right lower second bosses 61, 62 are spaced by different distances to the left and the right from the vehicle body center plane. Specifically, the second boss surfaces 61b, 62b of the lower second bosses 61, 62 on the left side are located closer to the vehicle body center plane than those on the right side, so that the lower engine hanger 58 is of mirror-image on the left and right sides. However, the lower second boss surfaces 61b, 62b of the left and right lower second bosses 61, 62 may be spaced by the same distance to the left and the right from the vehicle body center plane, and may be provided on the same plane as the lower first boss surfaces 56b on both the left and right sides, by modifying the lower engine hanger 58, for example.

The boss surfaces 55b, 56b, 59b, 60b, 61b, 62b, 67b, 68b of the bosses 55, 56, 59, 60, 61, 62, 67, 68 and the pivot seat surfaces 41 on both sides of the pivot portion 10 are formed by performing mechanical work or the like by use of a milling machine or the like after the casting of the rear piece 38, whereby they are enhanced in surface accuracy such as position, inclination, smoothness, etc. As a result of this, the relative positional accuracy of the main frame 12, the side plates 16, the swing arms 9, and the engine hangers 57, 58 is enhanced, the swing arms 9 can be favorably supported by the main frame 12 and the left and right side plates 16, and a rear portion of the engine 15 can be favorably supported by the engine hangers 57, 58.

In forming the boss surfaces 55b, 56b, 59b, 60b, 61b, 62b, 67b, 68b and the pivot seat surfaces 41 as above-mentioned, if some of these surfaces, for example, some adjacent ones of these surfaces are provided on the same plane, they can be processed simultaneously and easily.

As has been described above, the frame assembly 5 for the motorcycle 1 in the above-described embodiment has a configuration in which the engine 15 is suspended from the main frame 12. The main frame 12 extends rearward from the head pipe 6 along the center of vehicle width, and then is bent on the rear side of the engine 15 so as to extend down to the pivot portion 10. The swing arms 9 are pivotally supported by the pivot portion 10, and are held between the left-right pair of side plates 16 disposed with the main frame 12 therebetween. The side plates 16 each abut on and are joined to the first bosses 55, 56 provided in the main frame 12, and the engine hangers 57, 58, which supporting the engine 15 on the main frame 12, abut on and are joined to the second bosses 59, 60, 61, 62 provided in the main frame 12. In the frame assembly 5, each of the side plates 16 is provided with the plate-side bosses 46, 47 for adjusting the spacing between itself and the main frame 12, and an appropriate combination of adjacent ones of the first boss surfaces 55b, 56b, abutting on the side plate 16, of the first bosses 55, 56 and the second boss surfaces 59b, 60b, 61b, 62b, abutting on the engine hangers 57, 58, of the second bosses 59, 60, 61, 62 are formed on the same plane.

According to this configuration, even when modifying the spacing between the main frame 12 and the side plate 16 according to the swing arm width, it is possible to accommodate the spacing requirement by replacing the comparatively small side plate 16, and the need to modify the comparatively large main frame 12 is eliminated, so that it is possible to suppress the cost required for modifying the swing arm width and to enhance the degree of freedom in vehicle body designing.

In addition, even when applying mechanical work or the like to the first and second boss surfaces 55b, 56b, 59b, 60b, 61b, 62b so as to enhance the surface accuracy thereof for the purpose of enhancing the positional accuracy of the side plates 16 and the engine hangers 57, 58, part of the processing can be carried out simultaneously, so that the number of steps for manufacturing the frame assembly 5 can be reduced.

Further, in the frame assembly 5 for the motorcycle 1, the seat frame 13 extends rearward from a rear portion of the main frame 12, and abuts on and is joined to the third bosses 67, 68 provided in the main frame 12. An appropriate combination of adjacent ones of the third boss surfaces 67b, 68b, abutting on the seat frame 13, of the third bosses 67, 68 and the first and second boss surfaces 55b, 56b, 59b, 60b, 61b, 62b are formed on the same plane, whereby it is ensured that even in the case where the third boss surfaces 67b, 68b are formed by a mechanical work or the like, the mechanical work or the like can be appropriately collectively conducted simultaneously with the processing of the first and second boss surfaces 55b, 56b, 59b, 60b, 61b, 62b, so that the number of steps for manufacturing the frame assembly 5 can be further reduced.

The present invention is not limited to the above-described embodiment. For example, the plate-side bosses 46, 47 may be formed separately from the plate main body 45, and may be integrally attached to the plate main body 45 by welding, screwing or the like. Furthermore, separate component parts corresponding to the plate-side bosses 46, 47 for adjusting the spacing between the main frame 12 and each side plate 16 may be integrally attached to at least one of the main frame 12 and the side plate 16 by welding, screwing or the like. According to this configuration, even in the case of modifying the spacing between the main frame 12 and the side plate 16 according to the swing arm width, it is possible to cope with the requirement easily and flexibly, so that the degree of freedom in vehicle body designing can be enhanced. Besides, where the separate component parts are provided so as to be replaceable, the just-mentioned effect is further enhanced.

The configuration in the above embodiment is merely an example, and the boss surfaces 55b, 56b, 59b, 60b, 61b, 62b, 67b, 68b may be formed on the same plane, in any combination thereof. Naturally, in addition, various modifications are possible within the scope of the gist of the present invention.

While a working example of the present invention has been described above, the present invention is not limited to the working example described above, but various design alterations may be carried out without departing from the present invention as set forth in the claims. The foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. A motorcycle frame comprising:
   a head pipe;
   a main frame for supporting an engine thereon, said main frame extending rearwardly from the head pipe along a center of vehicle width, and then bending downward on a rear side of said engine so as to extend down to a pivot portion;
   a left-right pair of side plates fixed to respective left and right sides of said main frame, said side plates each abutting on and joined to a first joint portion provided in said main frame;
   a swing arm pivotally supported by said pivot portion, said swing arm held between the left-right pair of side plates disposed with said main frame therebetween; and
   an engine hanger for supporting said engine on said main frame, said engine hanger abutting on and joined to a second joint portion provided in said main frame,
   wherein each said side plate comprises:
      a plate main body having a hole formed therein to receive a pivot shaft of the swing arm therethrough and
      a spacer portion integrally formed with the plate main body for adjusting the spacing between said plate main body and said main frame, and
   wherein a first joint surface of said first joint portion, which abuts on said side plate, and a second joint surface of said second joint portion, which abuts on said engine hanger, are situated substantially on the same plane.

2. The motorcycle frame as set forth in claim 1, wherein a seat frame extends rearward from a rear portion of said main frame, said seat frame abutting on and being joined to a third joint portion provided in said main frame, and
   a third joint surface of said third joint portion, which abuts on said seat frame, is provided on the same plane as said first and second joint surfaces.

3. The motorcycle frame as set forth in claim 1, wherein the spacer portion of each side plate of the left-right pair of side plates comprises an upper mounting boss and a lower mounting boss, the upper and lower mounting bosses protruding from a lateral side surface of the side plate.

4. The motorcycle frame as set forth in claim 1, wherein the main frame comprises a frame body and a rear portion, the rear portion corresponding to a bend in the main frame and a portion which extends downward to the pivot portion on the rear side of said engine, wherein below the bend, the rear portion is slightly inclined downwardly and forward, and
   wherein the first and second joint surfaces are disposed on a lateral side face of the main frame at a location intermediate the bend and the pivot portion.

5. The motorcycle frame as set forth in claim 1, wherein the main frame comprises first and second upper joint surfaces disposed above the pivot portion and first and second lower joint surfaces disposed below the pivot portion.

6. The motorcycle frame as set forth in claim 1, wherein the main frame comprises a frame body and a rear frame portion, and the rear frame portion is slightly inclined downwardly and forward, and
   wherein the rear frame portion comprises a forwardly-extending protuberance, and wherein the pivot portion extends in a left-right direction of the vehicle through the protuberance.

7. The motorcycle frame as set forth in claim 6, wherein the main frame comprises first and second joint surfaces disposed on a first plane at a location above the protuberance, and first and second joint surfaces disposed on a second plane at a location below the protuberance.

8. The motorcycle frame as set forth in claim 6, wherein the main frame is a mono-backbone frame, and only an upper side of the engine is fixed to the frame assembly such that the engine is suspended on an underside of the main frame, and wherein the engine itself replaces an omitted lower frame member as a frame reinforcing member.

9. A motorcycle frame comprising:
   a head pipe;
   a main frame for suspending an engine, said main frame extending rearward from the head pipe along the center of a vehicle width and then bending downward on a rear side of said engine so as to extend down to a pivot portion;
   a left-right pair of side plates fixed to respective left and right sides of said main frame, said side plates each abutting on and joined to a first joint portion provided in said main frame; and
   a swing arm pivotally supported by said pivot portion, said swing arm held between the left-right pair of side plates disposed with said main frame therebetween,
   wherein at least one of said main frame and each said side plate is provided, as a separate member, with a spacer for adjusting the spacing therebetween.

10. The motorcycle frame as set forth in claim 9, wherein the frame assembly further comprises
    an engine hanger for supporting said engine on said main frame, said engine hanger abutting on and joined to a second joint portion provided in said main frame,
    a first joint surface of said first joint portion, which abuts on said side plate, and a second joint surface of said second joint portion, which abuts on said engine hanger, are provided on the same plane.

11. The motorcycle frame as set forth in claim 10, wherein a seat frame extends rearward from a rear portion of said main frame, and abuts on and is joined to a third joint portion provided in said main frame, and
    a third joint surface of said third joint portion, which abuts on said seat frame, is provided on the same plane as said first and second joint surfaces.

12. The motorcycle frame as set forth in claim 10, wherein each of the side plates comprises a through hole extending in the left-right direction of the vehicle, the through hole arranged coaxially with the pivot portion.

13. The motorcycle frame as set forth in claim 12, further comprising a pivot shaft, the pivot shaft extending through the pivot portion, a front end portion of the swing arm, and each plate of the pair of side plates via the through hole, whereby the pivot arm is vertically swingably supported by the pivot portion.

14. The motorcycle frame as set forth in claim 9, wherein the spacer is integrally formed on each side plate of the left-right pair of side plates, the spacer comprising an upper mounting boss and a lower mounting boss, the upper and lower mounting bosses protruding from a lateral side surface of the side plate.

* * * * *